US007880671B2

(12) United States Patent
Lee et al.

(10) Patent No.: US 7,880,671 B2
(45) Date of Patent: *Feb. 1, 2011

(54) ELECTROMAGNETIC (EM) SOLVER USING A SHOOTING BOUNCING RAY (SBR) TECHNIQUE

(75) Inventors: Chul J. Lee, Lexington, MA (US); Axel R. Villanueva, Pelham, NH (US)

(73) Assignee: Raytheon Company, Waltham, MA (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/212,783

(22) Filed: Sep. 18, 2008

(65) Prior Publication Data

US 2010/0066595 A1 Mar. 18, 2010

(51) Int. Cl.
*G01S 13/00* (2006.01)

(52) U.S. Cl. .................... 342/169; 342/159; 342/175; 342/179

(58) Field of Classification Search .................. 342/169
See application file for complete search history.

(56) References Cited

U.S. PATENT DOCUMENTS

| | | | |
|---|---|---|---|
| 4,123,165 A | 10/1978 | Brown et al. | |
| 4,373,808 A | 2/1983 | Pell et al. | |
| 5,086,396 A | 2/1992 | Waruszewski, Jr. | |
| 5,096,281 A | 3/1992 | Windebank et al. | |
| H1181 H | 5/1993 | Rihaczek | |
| 5,227,801 A | 7/1993 | Pierce | |
| 5,305,430 A | 4/1994 | Glassner | |
| 5,317,689 A | 5/1994 | Nack et al. | |
| 5,355,442 A | 10/1994 | Paglieroni et al. | |
| 5,392,050 A | 2/1995 | Guerci et al. | |
| 5,583,975 A | 12/1996 | Naka et al. | |
| 5,588,032 A | 12/1996 | Johnson et al. | |
| 5,594,844 A | 1/1997 | Sakai et al. | |
| 5,616,031 A | 4/1997 | Logg | |
| 5,933,146 A * | 8/1999 | Wrigley | 345/420 |
| 5,953,722 A | 9/1999 | Lampert et al. | |
| 6,005,916 A | 12/1999 | Johnson et al. | |
| 6,031,542 A | 2/2000 | Wittig | |
| 6,212,132 B1 | 4/2001 | Yamane et al. | |
| 6,750,805 B1 | 6/2004 | Cameron | |
| 6,750,859 B2 | 6/2004 | Sowizral et al. | |

(Continued)

OTHER PUBLICATIONS

Bhalla, et al., "Three-Dimensional Scattering Center Extraction Using the Shooting and Bouncing Ray Technique", Nov. 1996, IEEE Trans. on Antennas and Propagation, vol. 44, No. 11, 9 pages.*

(Continued)

*Primary Examiner*—Thomas H Tarcza
*Assistant Examiner*—Timothy A Brainard
(74) *Attorney, Agent, or Firm*—Daly, Crowley, Mofford & Durkee, LLP

(57) ABSTRACT

In one aspect, a system to generate radar signatures for multiple objects in real-time includes a first module including at least one processor to perform a shooting and bouncing (SBR) technique to solve for physical optics and multi-bounce characteristics of the objects. The at least one processor includes a central processing unit to perform dynamic ray tracing and a graphics processing unit (GPU) to perform far field calculations. The GPU includes a hit point database to store entries associated with rays that intersect an object.

20 Claims, 12 Drawing Sheets

U.S. PATENT DOCUMENTS

| | | | |
|---|---|---|---|
| 6,924,763 | B2 | 8/2005 | Poullin |
| 6,941,303 | B2 | 9/2005 | Perrizo |
| 7,123,548 | B1 | 10/2006 | Uzes |
| 7,289,118 | B2 | 10/2007 | Schmittler et al. |
| 7,348,975 | B2 | 3/2008 | Reshetov et al. |
| 7,382,397 | B2 | 6/2008 | Mottur |
| 7,535,408 | B2 | 5/2009 | Kuhn |
| 7,567,205 | B1* | 7/2009 | Lee ............................ 342/169 |
| 7,592,947 | B1* | 9/2009 | Lee ............................ 342/169 |
| 2002/0060784 | A1 | 5/2002 | Pack et al. |
| 2002/0075260 | A1 | 6/2002 | Brokenshire et al. |
| 2002/0087858 | A1 | 7/2002 | Oliver et al. |
| 2003/0011519 | A1 | 1/2003 | Breglia et al. |
| 2003/0022395 | A1 | 1/2003 | Olds |
| 2003/0093430 | A1 | 5/2003 | Mottur |
| 2003/0112234 | A1 | 6/2003 | Brown et al. |
| 2005/0138073 | A1 | 6/2005 | Zhou et al. |
| 2006/0059494 | A1* | 3/2006 | Wexler et al. ............... 718/105 |
| 2006/0160495 | A1 | 7/2006 | Strong |
| 2006/0210169 | A1 | 9/2006 | Colestock et al. |
| 2007/0061619 | A1* | 3/2007 | Nemirovsky et al. .......... 714/12 |
| 2007/0165042 | A1* | 7/2007 | Yagi ........................... 345/557 |
| 2008/0052334 | A1* | 2/2008 | Yamazoe .................... 708/191 |
| 2008/0132174 | A1 | 6/2008 | Corral et al. |
| 2009/0040096 | A1 | 2/2009 | Lee et al. |
| 2009/0040098 | A1 | 2/2009 | Lee et al. |

OTHER PUBLICATIONS

Bhalla, et al., "Near-Field Signature Prediction Using Far-Field Scattering Centers Extracted from the Shooting and Bouncing Ray Technique", Feb. 2000, IEEE Trans. on Antennas and Propagation, vol. 48, No. 2, 2 pages.*

Notification of Transmittal of the International Search Report and the Written Opinion of the International Searching Authority, or the Declaration, PCT/US2008/072433 dated Feb. 24, 2009.

Lozano L et al: "Improvements in Ray-Tracing Acceleration Techniques to Compute Diffraction Effect and Doubles and triples Effects in the RCS Prediction of Complex Targets", Antennas and Propagation Society Symposium, 2005. IEEE Washington, DC, Jul. 3-8, 2005, Piscataway, NJ: IEEE, US, vol. 3A, Jul. 3, 2005, pp. 93-96, XP010859931, ISBN: 978-0-7803-8883-3, the whole document.

Schmitz J L et al: "Zpatch. A high frequency bistatic signature prediction code", Radar Conference, 1997, IEEE National Syracuse, NY, USA May 13-15, 1997, New York, NY, USA, IEEE, US, May 13, 1997, pp. 232-236, XP010224774, ISBN: 978-0-7803-3731-2, the whole document.

Yu C L et al: "Radar cross section computation and visualization by shooting-and-bouncing ray (SBR) technique", Proceedings of the antennas and Propagation Society International Symposium (APSIS). Chicago, Jul. 20-24, 1992; [Proceedings of the Antennas and Propagation Society International Symposium (APSIS)], New York, IEEE, US, vol. -, Jul. 18, 1992, pp. 1323-1326, XP010065787, ISBN: 978-0-7803-0730-8, the whole document.

Savides T et al: "Radar simulation using the shooting and bouncing ray technique" CCECE 2003. Canadian Conference on Electrical and Computer Engineering, Montreal, Canada, May 4-7, 2003; [Canadian Conference on Electrical and Computer Engineering], New York, NY, IEEE, US, vol. 1, May 4, 2003, pp. 307-310, XP010653888, ISBN: 978-0-7803-7781-3, the whole document.

Ozturk A K: "Implementation of Physical Theory of Diffraction for Radar Cross Section Calculations", The Institute of Engineering and Sciences of Bilkent University, in Partial Fulfillment of the Requirements for the Degree of Master of Science, Jul. 2002, 72 pages.

Shore R A, Yaghjian A D: "Application of incremental length diffraction coefficients to calculate the pattern effects of the rim and surface cracks of a reflector antenna", Antennas and Propagation Society International Symposium, 1993, AP-S Digest, pp. 1350-1353.

C. Ozdemir, R. Bhalla, H. Ling, "Fast ASAR Imag Formation Using the Shooting and Bouncing Ray Technique", IEEE Antennas and Propagation Society International Symposium, vol. 4, pp. 2605-2608, Jul. 13-18, 1997.

T.B. Hansen, "Corner Diffraction Coefficients for the Quarter Plate", IEEE transactions on Antennas Propagation, vol. 39, No. 7, pp. 976-984, Jul. 1991.

R.A. Shore, A.D. Yaghjian, "Application of Incremental Length Diffraction Coefficients to Calculate the Pattern Effects of the Rim and Surface Cracks of a Reflector Antenna", IEEE Antennas and Propagation Society International Symposium, 1993.

Havran V: "Heuristic Ray Shooting Algorithms", PhD thesis, Czech Technical University in Prague, Nov. 2000, 220 pages.

Ufimtsev, P. Ya., "Diffraction of Plane Electromagnetic Waves by a Thin Cylindrical Conductor", Radio Eng. Electron Phys., vol. 7, pp. 241-249, 1962.

Pathak et al., "Model, Ray, and Beam Techniques for Analyzing the EM Scattering by Open-Ended Waveguide Cavities", IEEE Transaction on Antennas and Propagation, vol. 37, No. 5, May 1989, pp. 635-647.

Pathak et al., "An Efficient Hybrid FE-BI-TW-Collective Ray Formulation for Analysis of Large Conformal Arrays", 2008 Union Radio Scientifique Internationale—(URSI) General Assembly, Aug. 7-16, 2008, 4 pages.

Oguzer et al., "On the Elimination of Infinities in the PO Component of Equivalent Edge Currents", Wave Motion, vol. 18, pp. 1-10, 1993.

Prabhakar H. Pathak, "High-Frequency Techniques for Antenna Analysis", Proceedings of the IEEE, vol. 80, No. 1, Jan. 1992, pp. 44-65.

Book, Edited by Andrew S. Glassner, "An Introduction to Ray Tracing", U.S. Edition Published by Academic Press, 1989, 329 pages.

Steve Kosanovich, "Fundamentals of Xpatch", Training Class Manual, SAIC DEMACO, Apr. 28, 2008.

Antenna Handbook, vol. I Fundamentals and Mathematical Techniques; P.H. Pathak, Ohio State University ElectroScience Laboratory; Edited by Y.T. Lo and S.W. Lee; Chapter 4, pp. 4-1-4-110, Van Nostrand Reinhold, New York, 1993.

U.S. Appl. No. 12/212,787, Chul J. Lee, filed on Sep. 18, 2008, 39 pages.

U.S. Appl. No. 12/212,779, Chul J. Lee et al., filed on Sep. 18, 2008, 40 pages.

U.S. Appl. No. 12/212,786, Chul J. Lee, filed on Sep. 18, 2008, 40 pages.

U.S. Appl. No. 11/889,197, Chul J. Lee et al., filed on Aug. 9, 2008,, 13 pages.

PCT Patent Application No. PCT/US2008/072434, Chul J. Lee et al., filed on Aug. 7, 2008, 30 pages.

U.S. Appl. No. 11/889,198, Chul J. Lee et al., filed on Aug. 9, 2008, 14 pages.

PCT Patent Application No. PCT/US2008/072433, Chul J. Lee et al., filed on Aug. 7, 2008, 31 pages.

U.S. Appl. No. 12/138,711, Chul J. Lee et al., filed on Jun. 13, 2008, 27 pages.

U.S. Appl. No. 12/138,814, Chul J. Lee et al., filed on Jun. 13, 2008, 30 pages.

Notification of Transmittal of the International Search Report and the Written Opinion of the International Searching Authority, or the Declaration, PCT/US2008/072434 dated Feb. 6, 2009.

Walker et al., "Parallel Computation of Time-Domain Integral Equation Analyses of Electromagnetic Scattering and RCE", IEEE Transactions on Antennas and Propagation, IEEE Service Center, Piscataway, NJ, vol. 45., No. 4, Apr. 1, 1997, XP011002960, ISSN: 0018-926X, pp. 614-619.

Ngoly et al., "Parallel Post-Processing Techniques for Fast Radar Cross-Section Computation", 2006 12th Biennial IEEE Conf. on Electromagnetic Field Computation, Apr. 30, 2006, p. 377.

Jin-Lin Hu et al, "RCS Computation of Jet Engine with Complex Termination Based on Multiplaten Z-buffer Algorithm", Microwave Conf., 1999 Asia Pacific Singapore, Nov. 30-Dec. 3, 1999, Picscataway, NJ, USA, IEEE, Nov. 30, 1999, XP010374299, ISBN: 978-0-7803-5761-7, pp. 781-784.

Ling, H.; Chou, R.-C.; Lee, S.-W.; Shooting and bouncing rays: calculating the RCS of an Arbitrarily Shaped Cavity, Feb. 1989; Antennas and Propagation, IEEE Transactions on vol. 37, Issue 2, pp.(2): 194-205.

File downloaded for U.S. Appl. No. 11/889,197, filed Aug. 9, 2007, file through Jun. 15, 2009, 67 pages.

File downloaded for U.S. Appl. No. 11/889,198, filed Aug. 9, 2007, file through Jun. 15, 2009, 66 pages.

Real-time radar cross section of complex targets by physical optics graphical processing; Rius, J.M.; Ferrando, M.; Antennas and Propagation Society International Symposium, 1990, AP-S. Merging Technologies for the 90's'. Digest. May 7-11, 1990 pp. 1280-1283 vol. 3.

Xpatch 4: the next generation in high frequency electromagnetic modeling and simulation software; Andersh, D.; Moore, J.; Kosanovich, S.; Kapp, D.; Bhalla, R.; Kipp, R.; Courtney, T.: Nolan, A.; German, F.; Cook, J.; Hughes, J.; Radar Conference, 2000. The Record of the IEEE 2000 International.

3D scattering center extraction from Xpatch, Bhalla, R. Hao Ling, Dept. of Electr. & Comput. Eng., Texas Univ., Austin, TX; Antennas and Propagation Society International Symposium, 1995. AP-S. Digest, Jun. 18-23, 1995, vol. 4, on pp. 1906-1909 vol. 4.

File downloaded from PAIR for U.S. Appl. No. 12/212,786, filed Sep. 18, 2008, file through Apr. 1, 2010, 1170 pages. (6 parts).

File downloaded from PAIR for U.S. Appl. No. 12/212,787, filed Sep. 18, 2008, file through Apr. 1, 2010, 1477 pages. (8 parts).

File downloaded from PAIR for U.S. Appl. No. 12/212,779, filed Sep. 18, 2008, file through Apr. 1, 2010, 1159 pages. (5 parts).

File downloaded from PAIR for U.S. Appl. No. 12/212,779, filed Sep. 18, 2008, file from Apr. 1, 2010 through May 10, 2010, 13 pages.

Bhalla, et al., "Three-Dimensional Scattering Center Extraction Using the Shooting and Bouncing Ray Technique", IEEE Trans. on Antennas and Propagation, vol. 44, No. 11, Nov. 1996, 9 pages.

Bhalla, et al., "Near-Field Signature Prediction Using Far-Field Scattering Centers Extracted from the Shooting and Bouncing Ray Technique", IEEE Trans. on Antennas and Propagation, vol. 48, No. 2, Feb. 2000, 2 pages.

File downloaded for U.S. Appl. No. 12/212,779, filed Sep. 18, 2008, file from May 10, 2010 through Aug. 18, 2010, 9 pages.

File downloaded for U.S. Appl. No. 11/889,197, filed Aug. 9, 2007, file from Jun. 15, 2009, through Aug. 18, 2010, 119 pages.

File downloaded for U.S. Appl. No. 11/889,198, filed Aug. 9, 2007, file from Jun. 15, 2009 through Aug. 18, 2010, 131 pages.

* cited by examiner

ELECTROMAGNETIC (EM) SOLVER USING A SHOOTING BOUNCING RAY (SBR) TECHNIQUE

BACKGROUND

A radar system emits radio waves that are reflected by an object (also referred to as a target) in a form of a reflected signal that is detected by the radar system. In general, the reflected signal includes a component associated with a direct reflection from the object (sometimes called a single bounce (SB)) and a component from indirect reflections from the object (e.g., reflections off of other objects in space such as ground, buildings and so forth) (sometimes called a multiple bounce (MB)). Based on the intensity and angle of the reflected signal, the location of the object may be determined.

In training scenarios, instead of using actual objects, it is more practical and cost effective to use simulated radar objects. The simulated radar objects may be generated using radar signature modeling tools that emulate the radar object. For example, radar signature modeling tools are used to generate radar signature models to emulate a variety of objects that include, for example, ballistic missiles, airplanes, other 3-dimensional (3-D) objects and so forth. One such radar signature modeling tool is XPATCH®.

SUMMARY

In one aspect, a system to generate radar signatures for multiple objects in real-time includes a first module including at least one processor to perform a shooting and bouncing (SBR) technique to solve for physical optics and multi-bounce characteristics of the objects. The at least one processor includes a central processing unit to perform dynamic ray tracing and a graphics processing unit (GPU) to perform far field calculations. The GPU includes a hit point database to store entries associated with rays that intersect an object.

In another aspect, a method to generate radar signatures for multiple objects in real-time includes performing a shooting and bouncing (SBR) technique to solve for physical optics and multi-bounce characteristics of the objects. The performing includes performing dynamic ray tracing using a central processing unit and performing far field calculations using a graphics processing unit (GPU) by using a hit point database to store entries associated with rays that intersect an object.

In a further aspect, an article includes a machine-readable medium that stores executable instructions to generate radar signatures for multiple objects in real-time. The instructions cause a machine to perform a shooting and bouncing (SBR) technique to solve for physical optics and multi-bounce characteristics of the objects. The instructions cause a machine to perform the SBR technique include instructions causing a machine to perform dynamic ray tracing using a central processing unit and perform far field calculations using a graphics processing unit (GPU) by using a hit point database to store entries associated with rays that intersect an object.

In a still further aspect, a system to generate radar signatures for multiple objects in real-time includes a first module comprising at least one processor to perform a shooting and bouncing (SBR) technique to solve for physical optics and multi-bounce characteristics of the objects. The at least one processor to perform the SBR technique includes a central processing unit to perform dynamic ray tracing and a graphics processing unit (GPU) to perform far field calculations. The GPU includes a hit point database to store entries associated with rays that intersect an object. The system also includes a second module comprising at least one processor to perform a physical theory (PTD) technique to solve for material edges of the objects and a third module comprising at least one processor to perform an incremental length diffraction coefficient (ILDC) to solve for material boss/channel. Results from the first, second and third modules are coherently integrated by frequency to generate RCS values of the objects in real-time.

DETAILED DESCRIPTION

Prior radar cross section (RCS) signature prediction models generate objects using lookup tables in a database that is created offline sometimes requiring weeks to generate. However, a single database for multiple object scenarios is not practical to generate all potential scenarios and views in a real-time environment because such a database would be massive in size and contributes to increased processing time. In addition, the database approach cannot emulate RCS values that account for multiple objects nor does it account for the shadowing effect (sometimes referred to herein as "blockage") and interaction of the multiple objects. Described herein is a radar signature generation system that does not require massive database generation for generating multiple object scenarios by predicting RCS signatures in real-time.

As will be shown below, the radar signature generation system described herein uses a high frequency assumption in implementing Maxwell's equations. In one example, high frequency refers to the assumption that $d/\lambda$ is greater than 30, where d is the length of an object and $\lambda$ is the wavelength, and where $c=f\cdot\lambda$, c is equal to the speed of light and f is equal to frequency. In particular, certain physical phenomena may be solved independently and integrated coherently thereby saving significant overall processing time by allowing multiple processors to work on smaller pieces of the processing tasks. In one example, a shooting and bouncing ray (SBR) technique is used to solve for some of the physical phenomena (e.g., physical optics and multi-bounce interaction). As will be shown below, the rays used in the SBR technique under the high frequency assumption are also independent of each other thereby allowing for the further distribution of the SBR processor to be conducted over multiple processors.

As used herein objects are composed of facets, for example, triangles. In radar signature generation, one of the key points of analysis is the intersection between a ray extending from the radar (also called an illumination source) and a triangle on the object. It is at this intersection of the ray and triangle (also called a hit point) that the electromagnetic properties are determined.

Figure 1:
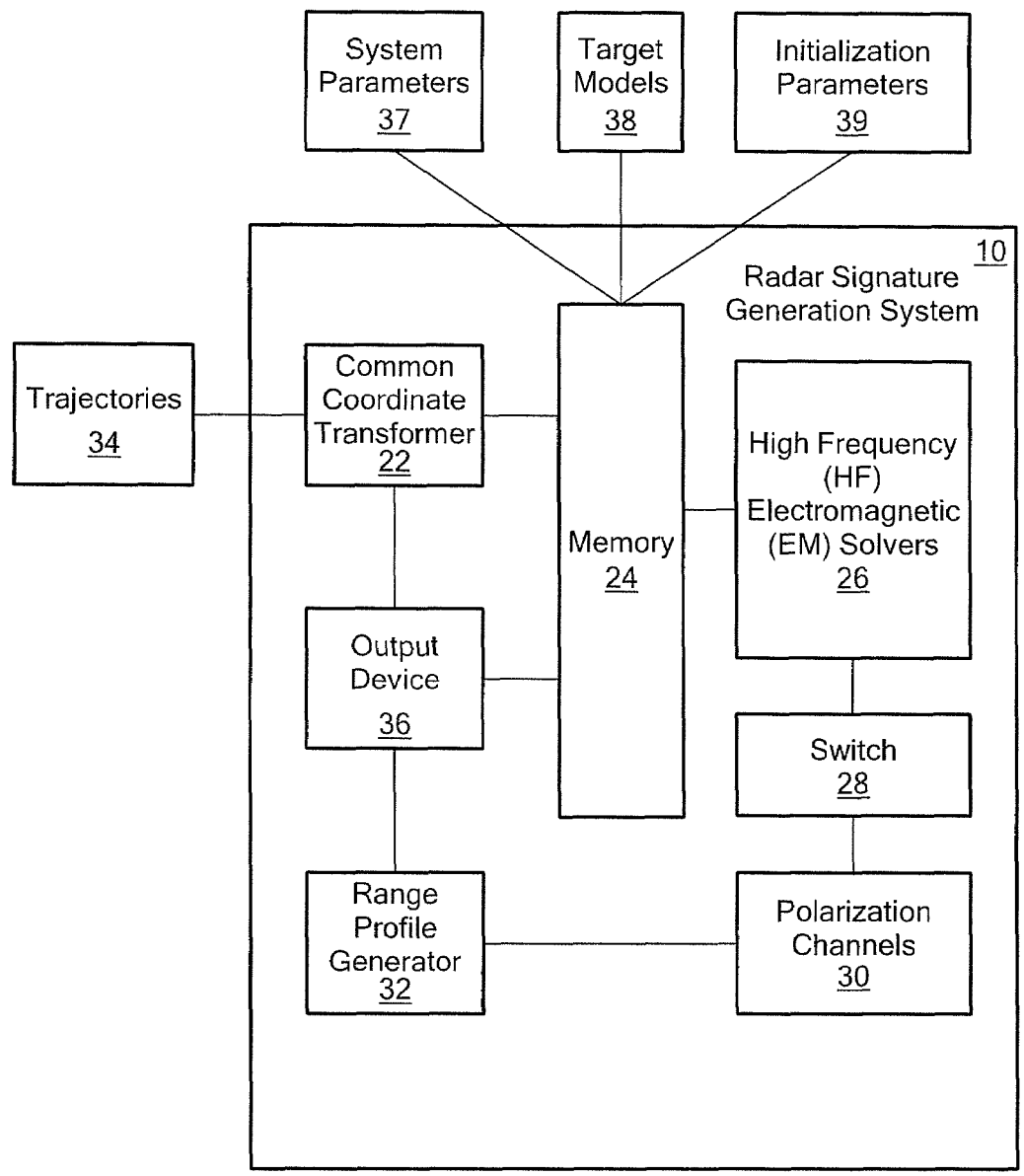
FIG. 1 is a block diagram of a radar signature generation system.
Figure 2:
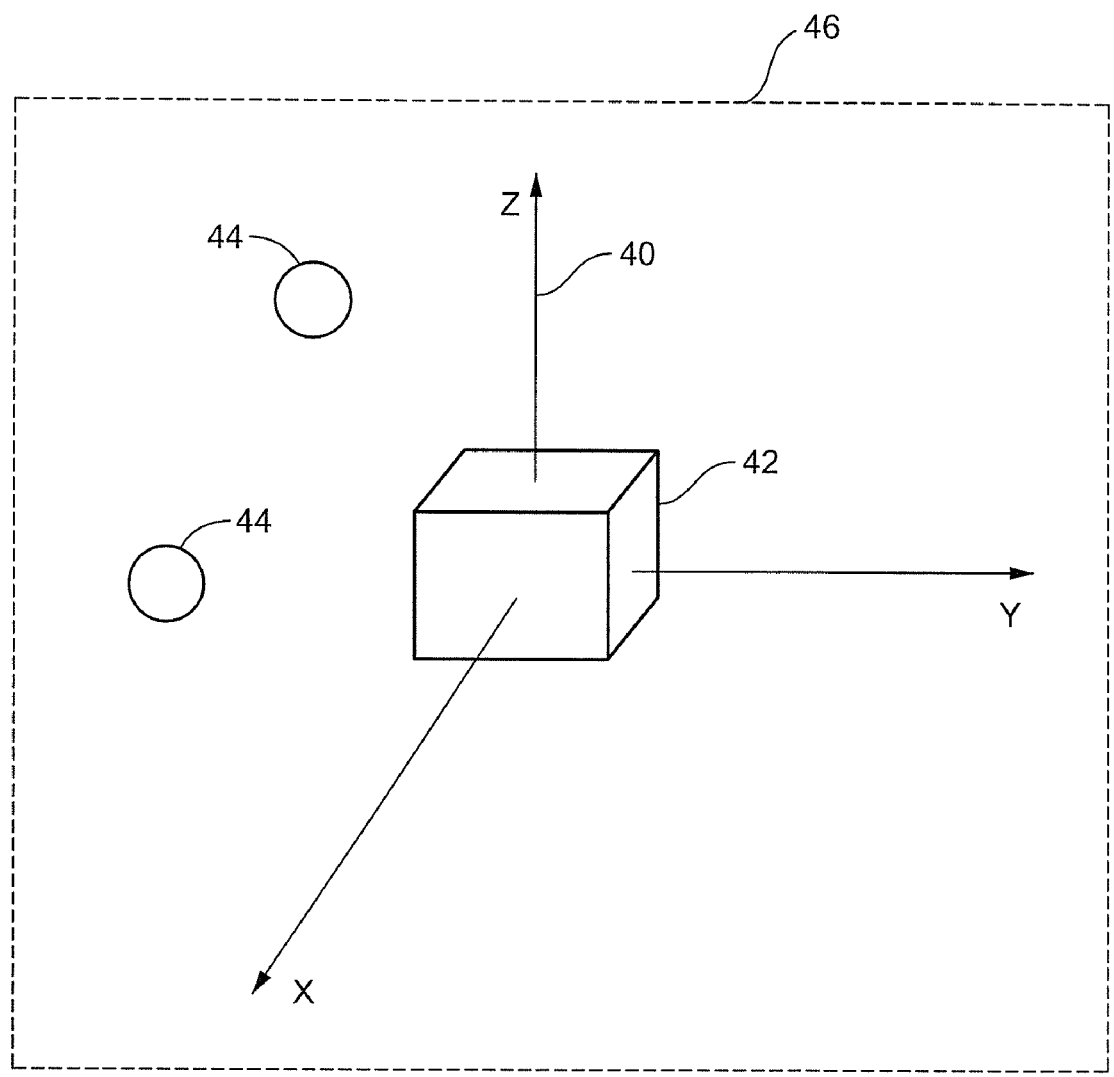
FIG. 2 is a diagram of a base object in a shooting window.

Referring to FIGS. 1 and 2, an example of the radar signature generation system is a radar signature generation system 10. The system 10 generates predicts RCS signatures of objects in real-time. The system 10 includes a common coordinate transformer 22, a memory 24 (e.g., random access memory (RAM)), electromagnetic (EM) solvers 26, polarization channels 30 connected to the EM solvers 26 by a switch 28, a range profile generator 32 and an output device 36 (e.g., a real-time display). Trajectories 34 of radar objects are provided to the system 10. For example, trajectories are determined by the Strategic and Theater Attack Modeling Process (STAMP), the Digital Integrated Combat Evaluator (DICE) and so forth. In particular, the trajectories 34 are provided to the common coordinate transformer 22. Trajectories 34 associated with individual objects define the objects' translation and orientation information. For example, the trajectories 34 include the location (e.g., in Cartesian coordinates), velocity, acceleration and orientation angles with respect to Earth rotation coordinates of each of the objects.

The common coordinate transformer 22 transforms the trajectories 34 to a common coordinate system and provides the transformed trajectories to the memory 24. The common coordinate transformer 22 determines the relative locations and orientations of the objects in the scenario relative to a coordinate framework 40 of a base object 42 so that all objects 44 are localized accordingly to a common coordinate frame. The illumination source direction (i.e., a radar view) is determined relative to the common coordinate frame 40. For example, in a shooting window 46 (i.e., from the radar perspective), the common coordinate transformer 22 selects one object 42 as the base object and establishing a coordinate frame 40 at the center of the object 42 and translating the other objects 44 with respect to the coordinate frame 40 of the selected object.

In one example, the base object is chosen arbitrarily. For example, objects considered threatening such as enemy missiles may be chosen. In other examples, the base object is chosen for each shooting window.

The common coordinate transformer 22 generates a file (called herein a Q-file) every resource period (e.g., 40 milliseconds) and stores the Q-file in the memory 24. The Q-file includes information such as time, radar range, altitude, number of objects, radar azimuth, radar elevation and orientation/translation matrix and an inverse of the 20 orientation/translation matrix for the objects. The Q-file is also used to render the objects in the scenario using the output device 36. The orientation/translation matrix includes the translations from the common coordinate transformer 22.

System parameters 37 and target models 38 are also provided to the system 10 and stored in the memory 36. The system parameters 37 include a number of frequencies to be evaluated (e.g., 256) and what frequencies including the center frequency and bandwidth. The target models include models of the objects. For example, the target models 38 may be for a type of missile or aircraft, for example. Initialization parameters 39 are also provided and stored in the memory 24. The initialization parameters also include data for use by the EM solvers 26 (e.g., edge data for the PTD solver 52 (FIG. 3)). The initialization parameters 36 also include an initial binary space partitioning (BSP) trees for the objects.

The EM solvers 26 solve for the EM parameters using the Q-files and provide complex RCS data to the range profile generator 34 through the polarization channels 30. The complex data includes real and imaginary components. In one example, the EM solvers 26 retrieve the Q-files from the memory 24.

The EM solvers 26 solve for the EM parameters independently and then the RCS data from each solver are coherently integrated. Each of the EM solvers 26 represent unique physical phenomena, such as surfaces, edges, multiple interactions, and so forth.

The EM solvers solve for physical phenomena for each polarization. For example, if the radar transmits a vertical signal component, the reflected signal may include a horizontal component or a vertical component. Likewise, if the radar transmits a horizontal signal component, the reflected signal may include a horizontal component or a vertical component. Thus, there are four polarization channels one for each polarization: vertical-vertical (V-V), vertical-horizontal (V-H), horizontal-vertical (H-V), horizontal-horizontal (H-H).

In one example, the EM solvers 26 generate 8 k bytes of data at the end (single precision complex RCS values for 4 polarizations and 256 frequency bins). In general, computational times for the EM solvers 26 are scalable, and their throughputs are not limited.

The output device 36 receives the range profile from the range profile generator 32 and the Q files from the common coordinate transformer 22, to render real-time scenarios including range profile and objects, for example, rendering real-time scenarios on a display.

Figure 3:
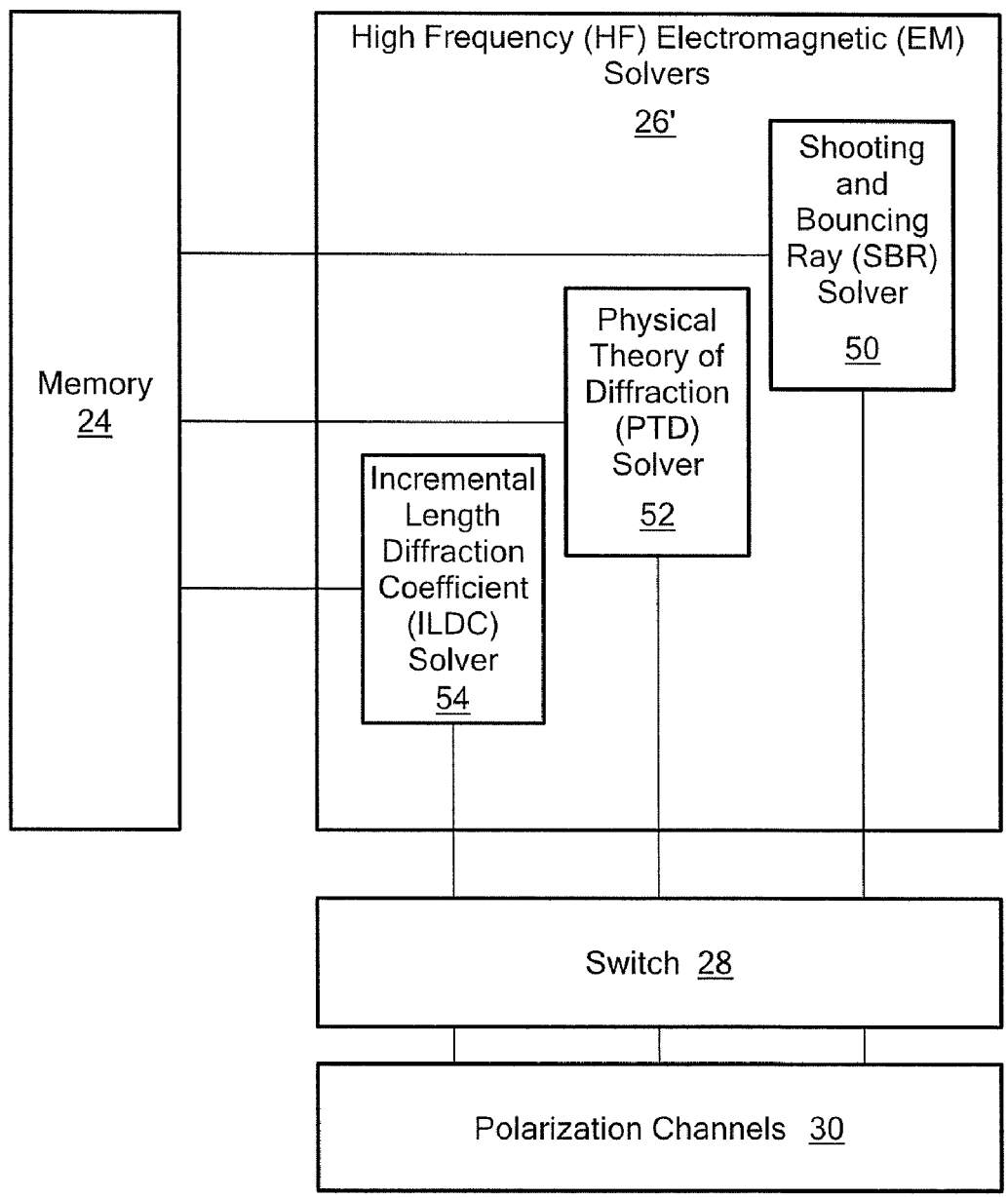
FIG. 3 is a block diagram of a portion of the radar signature generation system in FIG. 1.

Referring to FIG. 3, in one example, the EM solvers 26 are EM solvers 26'. The EM solvers 26' include a shooting and bouncing ray (SBR) solver 50, a physical theory diffraction (PTD) solver 52 and an incremental length diffraction coefficient (ILDC) solver 54.

Field solution methods fall into a hierarchy of methods, which includes inherently exact solutions. Among the inherently exact approaches are integral equation methods such as method of moment integrals (MoM), for example, or differential equation solutions, such as the finite element (FEM), finite difference (FD), or finite volume (FV) techniques. For high frequencies, or electrically large targets, these equation solutions rapidly become impractical to solve either because of computer time (e.g., in the case of MoM) or storage requirements (e.g., in the case of FEM, FD or FV).

Physical Optics (PO) is a field solution method obtained as an approximation to the inherently exact Stratton-Chu integral form of Maxwell's equations. The Chu-Stratton integrals for the total electric and magnetic fields scattered from an object can be very difficult to solve explicitly. High frequency techniques have been developed for solving these integrals. Physical Optics is an approach that is based upon surface currents. PO is valid for cases where the incident wavelength is much smaller than the length of the object that is scattering the energy. In PO theory, the geometry of the object becomes very important in calculating the total scattered electric and magnetic fields. PO uses the integral equation representation for the scattered fields. It also uses the high frequency assumption that the scattered field from one point on an object to any other point is negligible compared to the incident fields. Therefore, the total field at each point on the surface of the object is approximately equal to the incident field at that point.

The approach described herein uses hybrid geometrical and physical optics. The methods of physical optics have proven to be extremely useful for predicting exterior, or non-multiple scattering. The accuracy of this method has been shown to be much greater than what might be expected from the approximations on which the method is based. PO, in combination with the physical theory of diffraction (PTD), forms the basis for most industrial RCS prediction codes. Geometrical Optics (GO) forms the basis for ray-tracing techniques, and combines the advantages of simplicity and speed with validity for multiple interactions among electrically large components.

The SBR solver 50 determines physical optics (PO) of EM physics which includes first bounce SBR for perfectly electrically conducting (PEC) surfaces and material surfaces; and multi-bounce interaction of EM physics which includes PO integration of SBR trace for PEC and for material.

The PTD solver 52 and the ILDS solver 54 solve for EM physics for diffraction since PO does not correctly predict radar scattering properties for objects that contain sharp edges, tips, corners and so forth. Also, the PO equations depend upon the surface currents defined at each facet of the object. PO predicts surface currents at edges (i.e., edges of objects) that differ significantly from measurements. As used herein predicting the contribution of edge diffraction to the RCS of an object is determined by PTD for sharp edges using the PTD solver 52 and the ILDC for boss and channel using the ILDC solver 54.

Figure 4:
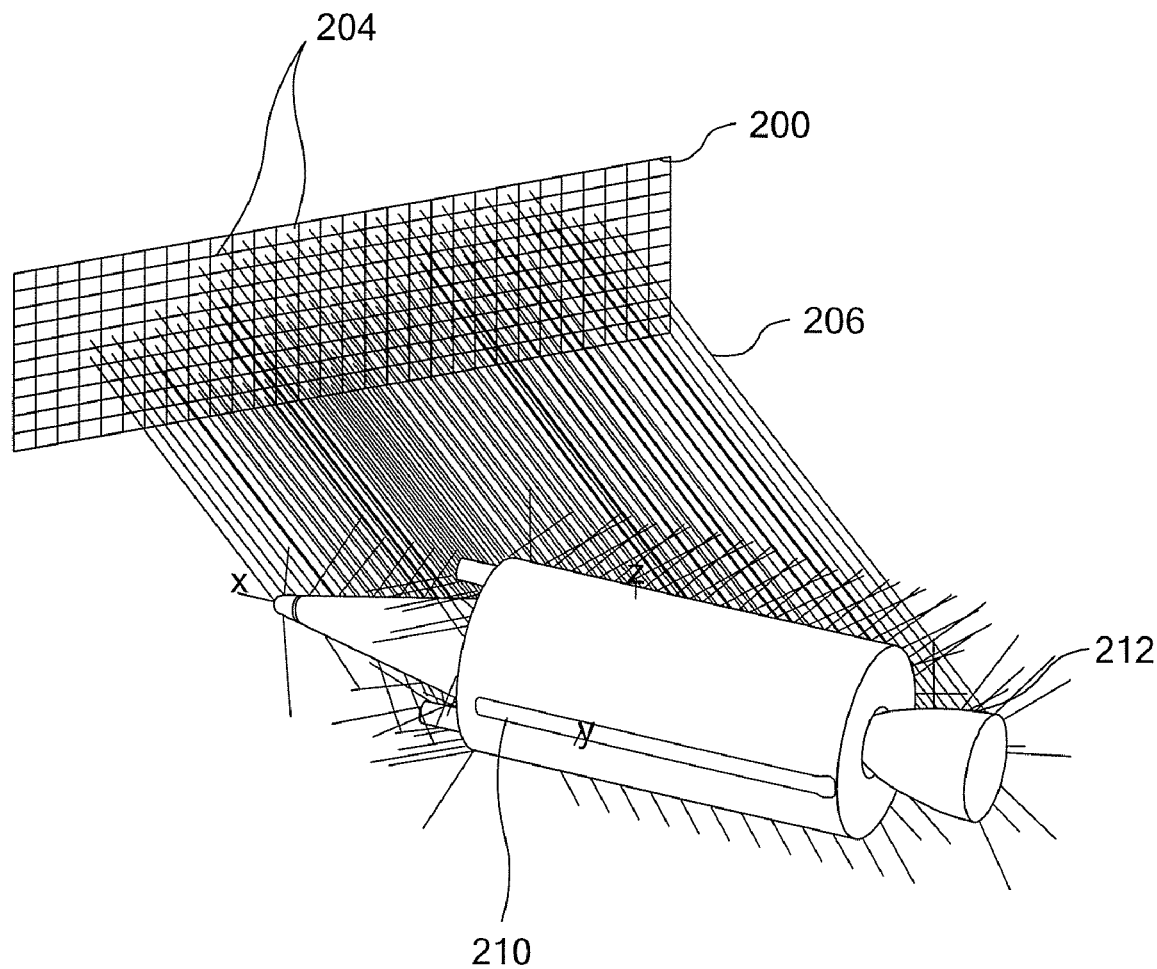
FIG. 4 is a diagram of a shooting and bouncing ray example.
Figure 6:
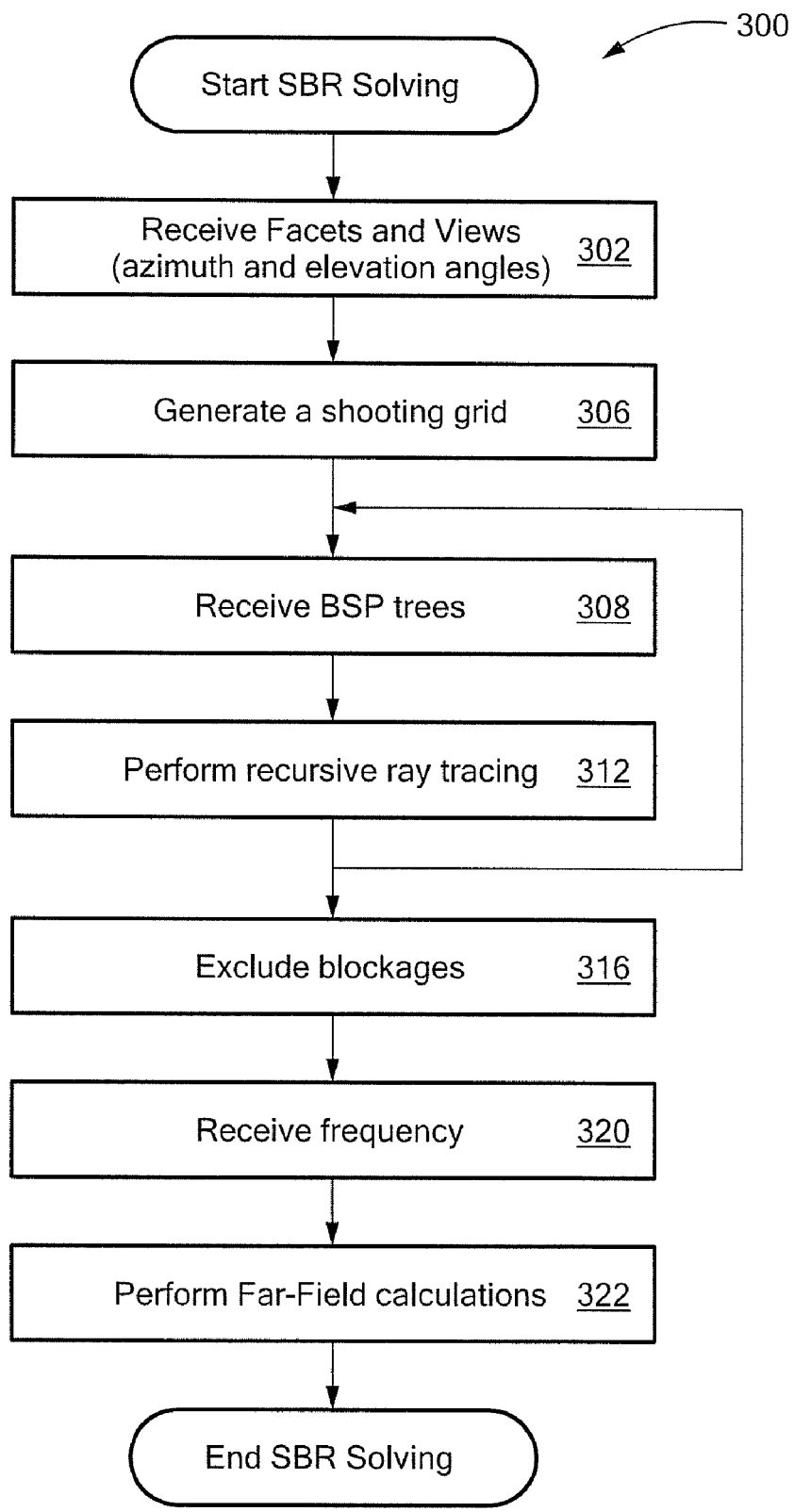
FIG. 6 is a flowchart of an example of a process for shooting and bouncing ray (SBR) solving.

FIG. 4 is a graphical representation of the SBR technique. Based on an azimuth and elevation (also called views) of a radar source (illumination source), a shooting grid 200 is formed. Each space 204 in the shooting grid 200 includes a ray 206. In most ray tracing algorithms, each ray 202 is checked to determine if it intersects with an object. For example, each ray 206 is traced until all reflection opportunities (bounces) are determined. Some of the rays 206 intersect with a target 210 at a hit point 212 (i.e., point of reflection of the ray 206). For simplicity, only the rays 206 that intersect with the target 210 are shown in FIG. 6. It is at a hit point 212, and, in particular, the triangles of the target 210 that the EM characteristics of the target must be determined. For example, at each hit point 212 an incident direction of the ray, a reflected direction, a vector of a local normal, surface material properties and so forth are determined.

In general, objects' computer aided design (CAD) models and BSP files are initially defined in a physically centered-body axis frame of reference. The BSP tree represents a recursive, hierarchical partitioning, or subdivision, of n-dimensional space into convex subspaces. BSP tree construction is a process which takes a subspace and partitions it by any "hyperplane" that intersects the interior of that subspace. The result is two new subspaces that can be further partitioned by recursive application of the method. A "hyperplane" in n-dimensional space is an n-1 dimensional object which can be used to divide the space into two half-spaces. For example, in three-dimensional space, the "hyperplane" is a plane. BSP trees are extremely versatile, because they are powerful sorting and classification structures. The BSP trees have uses ranging from hidden surface removal and ray tracing hierarchies to solid modeling and robot motion planning.

The BSP tree is relative to the spatial index structure, which effectively subdivides the volume spatially of the scene into smaller volumes (so-called voxels) each containing only a few triangles in this case. The BSP tree as used herein for objects in a scenario are used to traverse the rays in order to find the ray-triangle intersections. However, every time an object moves, it would require a new BSP tree to be generated. Generating new BSP trees every time (e.g., every resource period) an object has moved is expensive in terms of processing time.

Figure 5A:
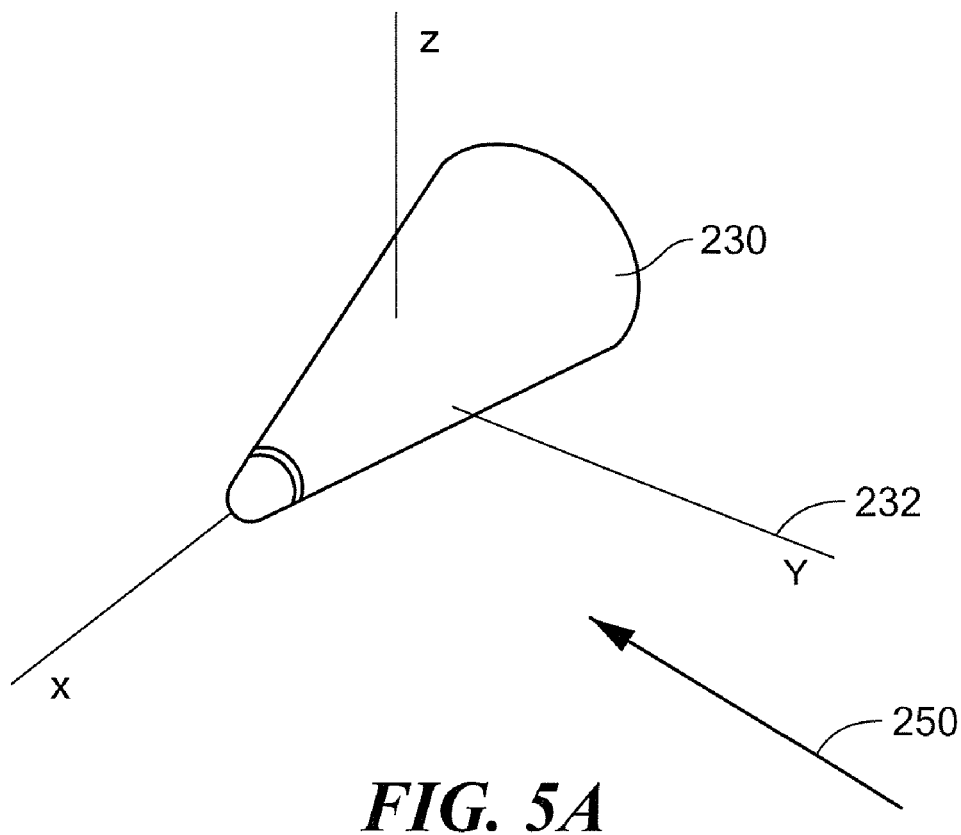
FIG. 5A is a diagram of an object before movement.
Figure 5B:
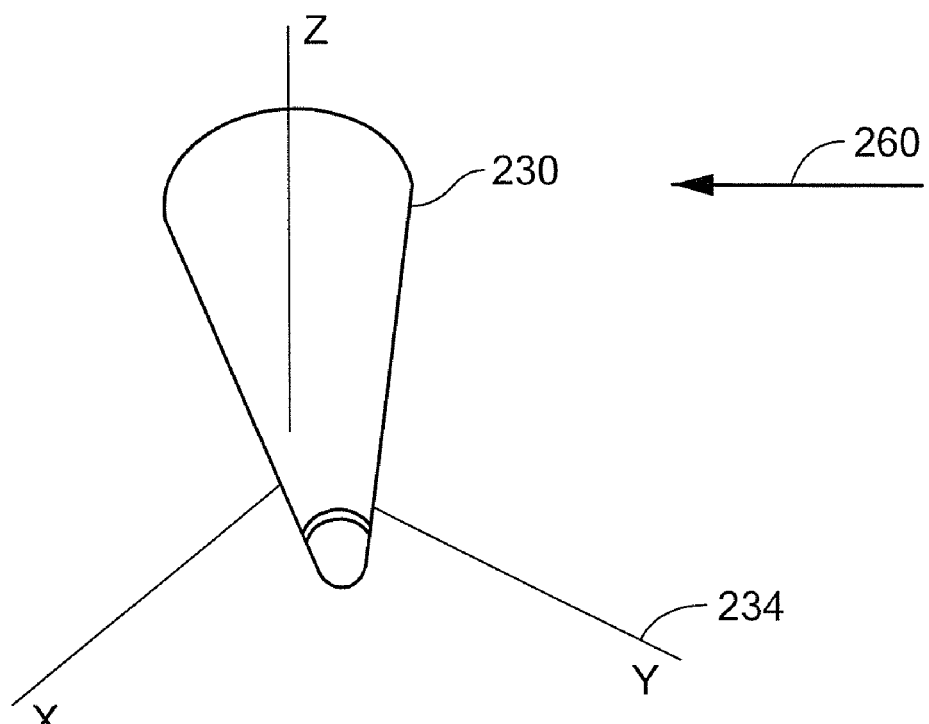
FIG. 5B is a diagram of the object after movement.

In FIG. 5A, an object 230 is initially on a centered-body axis frame of reference 232 (i.e., the origin of the centered-body axis frame of reference being the center of the object) with a traversing direction of 250 and is represented by an initial BSP tree in system 10. In FIG. 5B, the object 230 has moved with a common coordinate frame of reference 234 with a ray direction of 260. The system 10 does not generate BSP trees for objects in movement as depicted in FIG. 5B; but rather, the ray direction 260 is translated to the traversing direction 250 using the orientation/translation matrices from the Q-file. Put another way, the coordinates of the object in the common coordinate frame of reference 234 are translated to the body-axis frame 232. The ray is traced in the centered-body axis frame of reference 232 as in the static scene case of FIG. 5A. The ray-triangle intersection values are translated back to the common coordinate frame of reference 234 using inverse orientation/translation matrices. In one example, the translation is performed during SBR processing by SBR 50.

Referring to FIG. 6, one example of a process to perform SBR solving is a process 300. Process 300 receives the facets and the views (azimuth and elevation) (302). For example, the SBR solver 50 receives the triangles in the objects at the hit points and the azimuth and elevation from the Q files stored in the memory 24. Process 300 receives the initial BSP trees (308). For example, the initial BSP trees are read from the memory 24. Process 300 performs recursive ray tracing (312). The recursive ray provides an image of an object with the surfaces and edges so that electromagnetic analysis may be performed. In one example, the ray direction 260 is transformed to the traversing direction 250 using the orientation/translation matrices from the Q-file. The ray is traversed using the initial BSP tree.

Process 300 excludes blockages (316). Blockages represent data corresponding to a radar's blind spot or hits on the target that would be normally hidden from the radar (e.g., an object blocking another object from being observed by the radar). Process 300 receives frequencies (320). For example, the frequencies are received from the system parameters 37. In one example, there are 256 different frequencies or bins. Process 300 performs a far-field calculation (322). At each frequency or bin, the far-field calculation determines the surface current and scattered electric field at each bouncing location, and integrates them to compute the magnitude and phase. When an electric plane wave is incident to an object, it excites electric surface currents on that object. These currents radiate what is called a scattered field. Thus, the PO for the high frequency RCS prediction is an approximated technique to solve Maxwell's Equations to determine these surface currents, which can then be used to obtain the scattered electric field, so as to determine the RCS values.

Figure 7:
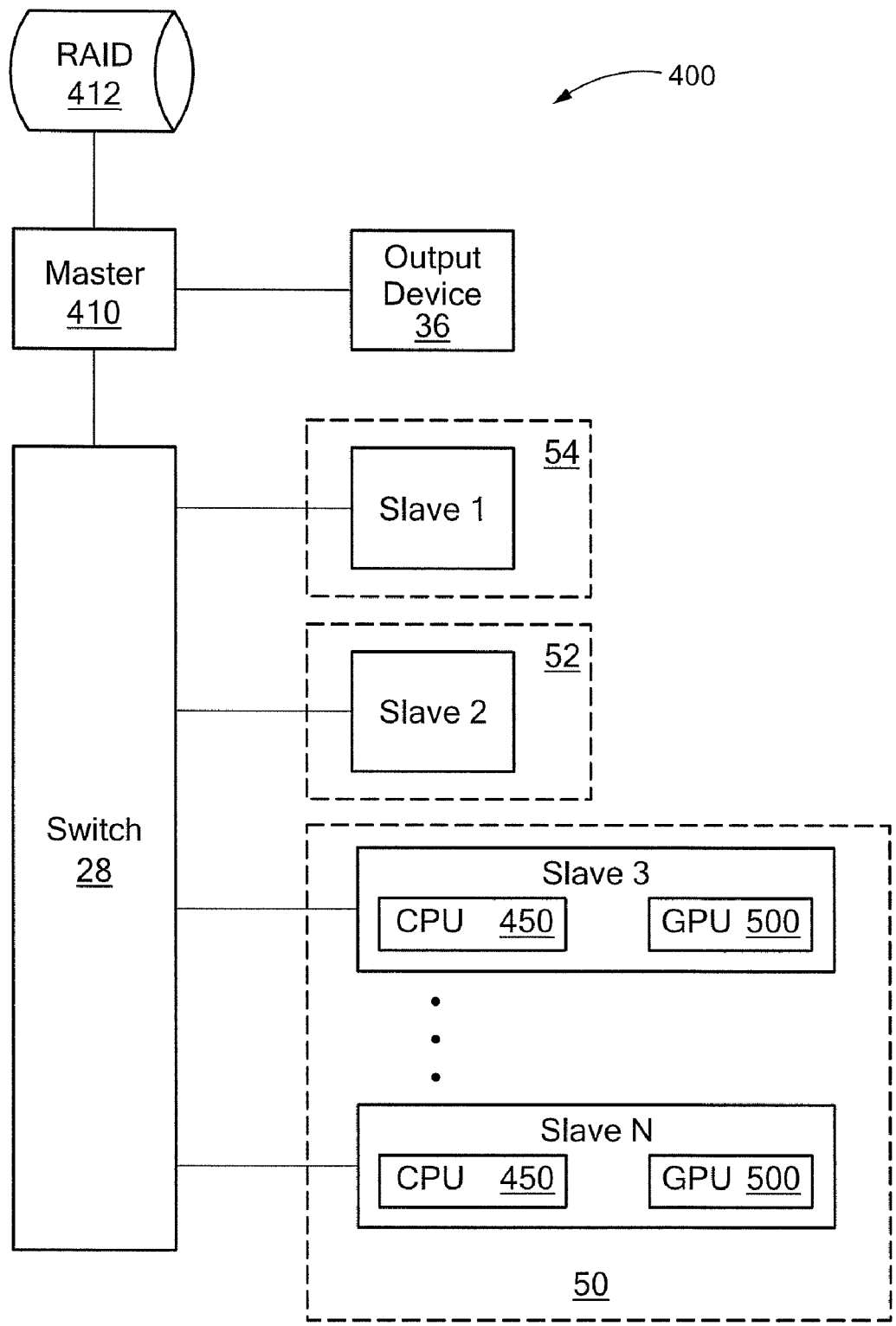
FIG. 7 is a block diagram of a hardware implementation of a portion of the radar system of FIG. 1.

Referring to FIG. 7, an example of a hardware implementation is a hardware configuration cluster 100. The hardware configuration cluster 400 is a scalable architecture. The hardware configuration cluster 400 includes a master switch 410 coupled to the switch 28 and the output device 36. The master 410 controls distribution and load balancing amongst the solvers 52, 52, 56 and controls the output device 36 (e.g., controls displays). The master 410 also stores predicted data using a redundant array of independent disks (RAID) 412, for example.

The switch 28 is coupled to the ILDC solver 54 which includes a slave (e.g., a slave 1), the PTD solver 52 which includes a slave (e.g., a slave 2) and the SBR solver 50 which includes slaves (e.g., slave 3 to slave N). The hardware architecture cluster 400 is scalable-cluster architecture composed of general purpose CPU's (e.g., a CPU 450). The ILDC solver 54 and the PTD solver 52 include a single slave while the SBR solver 50 includes multiple slaves because the SBR solver generally has the most intensive processing requirements. In one example, achieving real-time performance is dependent on N in the SBR solver 50 because of the intensive processing requirements. Thus, by merely adding additional slaves to the SBR 50 real-time processing is achieved. In other examples, achieving real-time processing may also occur by including at the ILDC solver 54 and the solver 52 additional slaves as well. Thus, hundreds of computer nodes may be added to the computing infrastructure of the cluster thereby providing necessary scalable performance. Each cluster node, for example, may include multiple CPUs allowing for multi-threaded operation for processes running on the nodes. The slaves 1 to N may include one or more CPUs 450 and one or more graphics processing units (GPUs) (e.g., a GPU 500).

Figure 8:
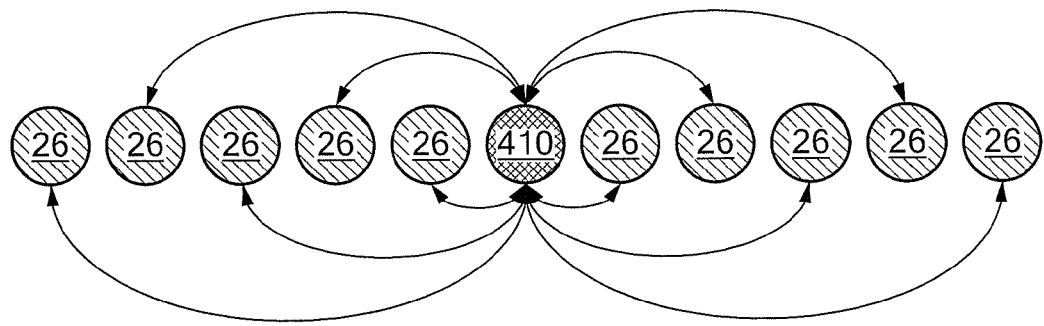
FIG. 8 is a messaging diagram used in the hardware configuration implementation of FIG. 7.

Referring to FIG. 8, a message passing interface (MPI) is a communication protocol that provides scalability, high performance, and portability to parallel computer systems such as the hardware configuration cluster 400. In one example, the master 410 controls and communicates with the EM solvers 26 and gathers the data at an end of each angle view using MPI.

Figure 9:
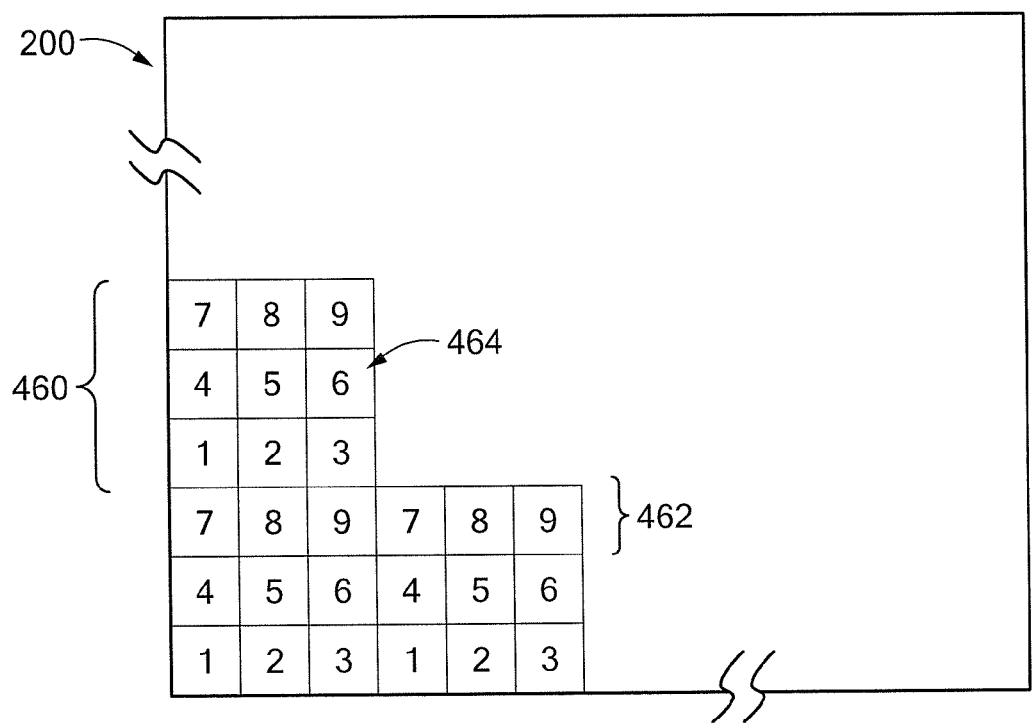
FIG. 9 is an example of an interleaved scheme for distributing processing of rays.

Referring to FIG. 9, to ensure that the processors are load balanced, the system 10 uses an interleaved gridding scheme. For example, if N=9 in FIG. 7 (i.e., there are slaves 1 to N) and each slave has one processor (J=1) then the total processors are M=J*N=9. The shooting window grid 200 is divided into segments (e.g., a segment 460) associated with processing threads allocated to the grid processing task. For example, the segment 460 is associated with a thread.

The segments are further subdivided into cells (e.g., a cell 462) which are associated with a corresponding processor. For example, a cell 464 refers to processor 6 of the nine processors in the example. Thus, the shooting grid 200 is interleaved such that the processors 1 to M are equally likely to be processing rays that intersect an object in the shooting window 200 than being idle.

The pattern of interleaved segments is determined by the number of allocated processing threads, for example, if four threads are needed a 2×2 segment configuration is used and if nine threads are needed a 3×3 segment configuration is used.

This type of grid division improves processing efficiency by providing a balanced load to all threads so that threads are not idle during processing of the entire shooting window 200. The processing load for processing a set of rays is driven by those rays that collide with objects. The distribution of rays in an interleaved fashion ensures an even number of rays that result in bounces are distributed to each cell.

In one example, the interleaved gridding scheme is the same as the interleaved gridding scheme used in patent application Ser. No. 11/889,197 filed on Aug. 9, 2007 which is assigned to the same assignee as this patent application and is incorporated herein in its entirety.

Figure 10A:
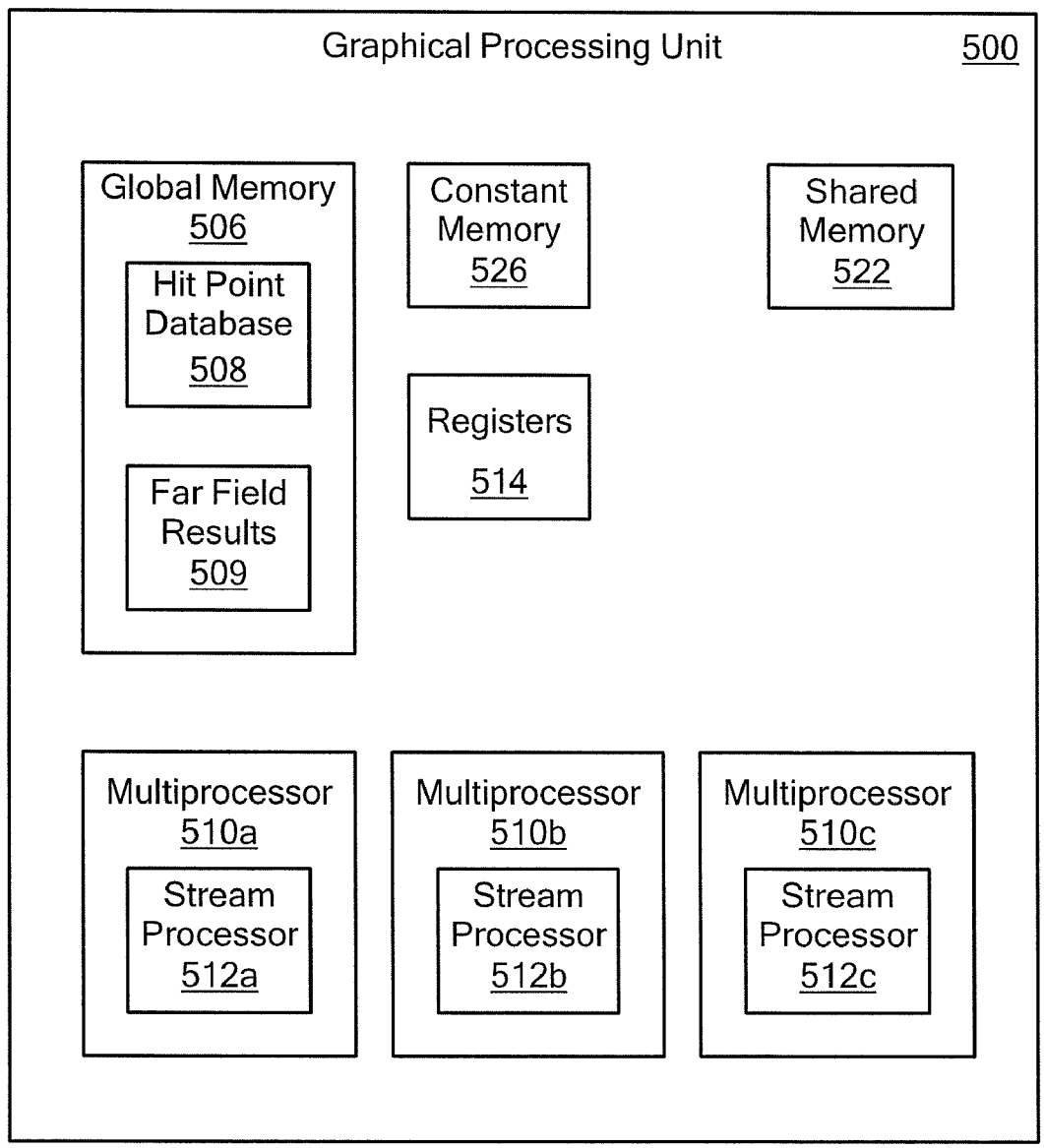
FIG. 10A is a diagram of a graphics processing unit (GPU) with a contributing database.
Figure 10B:
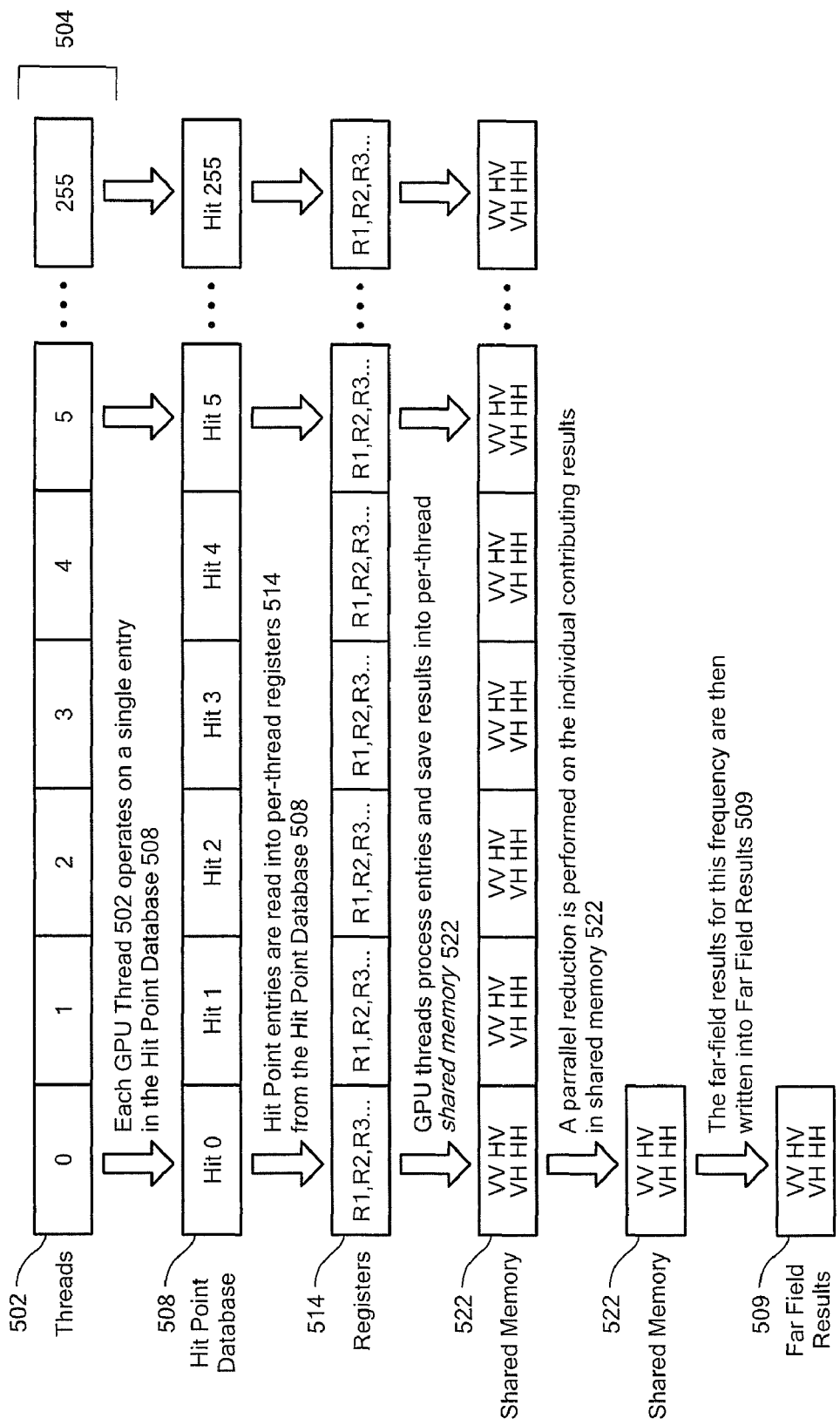
FIG. 10B is a diagram depicting far-field memory accesses and computational flows in the GPU.

Referring to FIGS. 10A and 10B, hardware acceleration of the SBR solver 50 contributes to generating real-time RCS predictions. As described above (e.g., FIG. 6), the SBR solver 50 performs ray tracing and a far-field waveform calculations. In one example, ray-tracing calculations are performed on the CPU 450 while far-field waveform calculations on the bounce points associated with multiple rays are simultaneously performed on the GPU 500 in order to take advantage of the parallel processing capabilities of the GPU 500.

There are two aspects to the compute hierarchy: the physical hardware of the device and the logical hierarchy. The logical hierarchy (which involves memory usage, and partitioning kernel, a shooting window, blocks, and threads) is mapped to the physical hardware of the device for the SBR EM solver 50.

A thread 502 corresponds to a single hit point database (HPDB) 508 entry in a global memory 606. A thread solves for a backscattering wave at each hit point. The HPDB 508 stores all bounce characteristics associated with every contributing ray (i.e., rays that intersect the target and return a signal to the radar source after so many bounces (e.g., 50 bounces)) in a given screen. Blocked rays (or blockages) are not included, since the radar would not receive a return signal from these rays.

The individual threads 502 perform the waveform calculations on each entry in the HPDB 508. The threads are organized into blocks (e.g., a block 504). For example, the block 504 is configured as 256x1, for 256 total threads per block. The blocks are organized into shooting windows.

A shooting window represents an entire HPDB 508. The size of the shooting window varies based on the HPDB 508. In one example, the shooting window is 200 blocks. A kernel is launched by the CPU to process a single shooting window. In one example, there are four CPUs and each launches a kernel to process the HPDB 508 generated by the CPU.

The GPU includes multiprocessors (e.g., a multiprocessor 510a, a multiprocessor 510b, a multiprocessor 510c). In one example, there are sixteen multiprocessors in each GPU. A multiprocessor is assigned a block 504 to process. Each multiprocessor 510a-510c includes a stream processor (e.g., a stream processor 512a, a stream processor 512b, a stream processor 512c), each operating on a single thread in the current block. In one example, each multiprocessor includes eight stream processors.

A shared memory 522 stores partial far-field results computed by each multi-processor. These partial results are ultimately aggregated to form final far-field results stored in a far field portion 509 of the global memory 506. A constant memory 526 includes pre-computed frequencies (i.e., which frequencies to observe) and wavelengths (i.e., λ of the objects) data each of which may be represent as arrays. The registers 514 store the state of each hit point (e.g., direction, origin, distance and so forth).

Figure 10C:
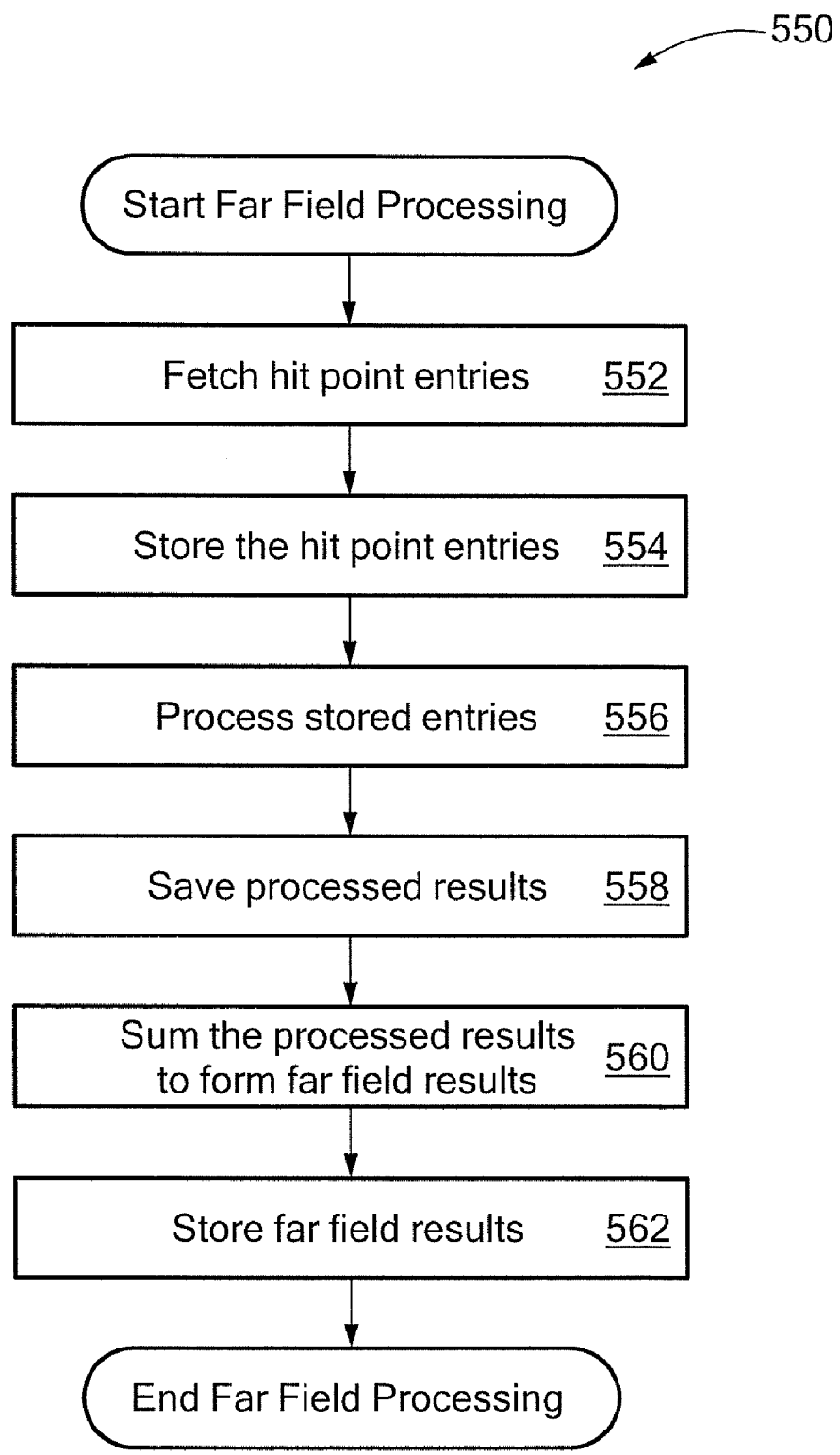
FIG. 10C is a flowchart of an example of a process for performing far field calculations.

Referring to FIGS. 10B and 10C, a single GPU block 504 operates on a single frequency. Each GPU thread 502 in the block 504 fetches an entry from the HPDB 508 (552) and stores it in registers 514, for example (554). The threads 502 then operate on their respective HPDB entries (556) and saves the results of their computations to the shared memory 522, for example (558). After all threads 502 have completed processing, the results are summed in each of the polarizations (560) and stored in the appropriate location in far field results 509 (562).

The GPU 500 provides faster computations with a higher memory throughput and parallel computation engines as compared to the CPU 450. The GPU 500 also frees CPU cycles. Specifically, by offloading computations to the GPU 500, the host CPU 450 is "freed" to continue processing other data that would otherwise be delayed. Since the CPU 450 and the GPU 500 operate in parallel much of the computational latency is hidden.

Figure 11:
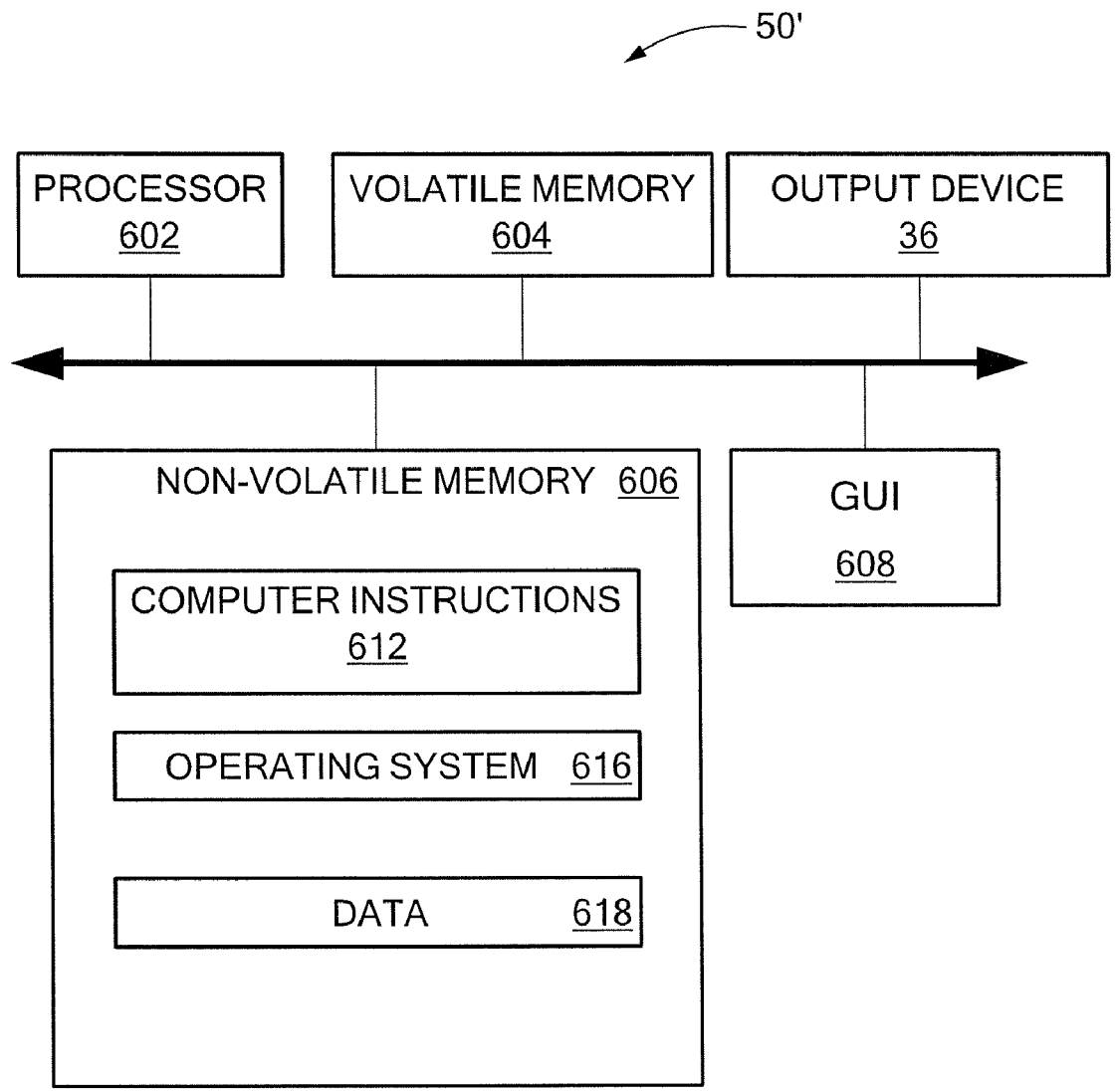
FIG. 11 is a block diagram of an example of a computer on which the processes of FIGS. 6 and 10C maybe implemented.

Referring to FIG. 11, a SBR solver 50 may be configured as a SBR system 50', for example. The SBR 50' includes a processor 602, a volatile memory 604, a non-volatile memory 606 (e.g., hard disk), a graphical user interface (GUI) 608 (e.g., a mouse, a keyboard, a display, for example) and the output device 36. The non-volatile memory 606 stores computer instructions 612, an operating system 616 and data 618 including the Q files, for example. In one example, the computer instructions 612 are executed by the processor 602 out of volatile memory 604 to perform all or part of the process 300 and/or the process 550.

Processes 300 and 550 are not limited to use with the hardware and software of FIG. 11; they may find applicability in any computing or processing environment and with any type of machine or set of machines that is capable of running a computer program. Processes 300 and 550 may be implemented in hardware, software, or a combination of the two. Processes 300 and 550 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 300 and/or process 550 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processes 300 and 550. Processes 300 and 550 may also be implemented as a machine-readable storage medium, configured with a computer program, where upon execution, instructions in the computer program cause the computer to operate in accordance with processes 300 and 550.

The processes described herein are not limited to the specific embodiments described. For example, the processes 300 and 550 are not limited to the specific processing order of FIGS. 6 and 10C, respectively. Rather, any of the processing blocks of FIGS. 6 and 10C may be re-ordered, combined or removed, performed in parallel or in serial, as necessary, to achieve the results set forth above.

The processing blocks in FIGS. 6 and 10C associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A system comprising:
a first module comprising at least one processor to perform a shooting and bouncing (SBR) technique to determine characteristics of multiple objects, the characteristics comprising:
physical optics of electromagnetic (EM) physics; and
multi-bounce interaction of EM physics, wherein the at least one processor comprising:
a central processing unit to perform dynamic ray tracing;
a graphics processing unit (GPU) to perform far field calculations, wherein the GPU comprises a hit point database to store entries associated with rays that intersect an object, and
wherein the system generates radar signatures for the multiple objects in real-time based on the characteristics determined.

2. The system of claim 1 wherein the GPU further comprises threads and each thread operates on a single entry in the hit point database.

3. The system of claim 2 wherein the GPU further comprises:
registers to receive hit point entries to store a state of each hit point, a hit point entry comprising direction, origin and distance;
a shared memory; and
a far field results memory.

4. The system of claim 3 wherein the GPU further comprises:
a constant memory; and
a plurality of multiprocessors comprising stream processors,
wherein a multiprocessor is assigned a block of the threads to process and a stream processor operates on a single thread in the block.

5. The system of claim 4 wherein the GPU is configured, on a per frequency basis, to:
read entries of the hit point database into the registers;
enable the threads to:
process register entries; and
save results into the shared memory on a per thread basis;
sum the results to form far field results; and
save the far-field results in the far field results memory.

6. A method, comprising:
generating radar signatures for multiple objects in real-time based on characteristics comprising:
performing a shooting and bouncing (SBR) technique to determine the characteristics of the multiple objects, the characteristics comprising:
physical optics of electromagnetic (EM) physics; and
multi-bounce interaction of EM physics, wherein performing the SBR technique comprises:
performing dynamic ray tracing using a central processing unit; and
performing far field calculations using a graphics processing unit (GPU) by using a hit point database to store entries associated with rays that intersect an object.

7. The method of claim 6, further comprising using each thread of the GPU to operate on a single entry in the hit point database.

8. The method of claim 7, further comprising using registers to store a state of each hit point, a hit point entry comprising direction, origin and distance.

9. The method of claim 7, further comprising assigning a multiprocessor to process a block of threads.

10. The method of claim 9, further comprising assigning a stream processor in the multiprocessor to operate on a single thread in the block.

11. The method of claim 9, further comprising on a per frequency basis:
reading entries of the hit point database into registers;
enabling the threads to:
  process entries of the registers; and
  save results into a shared memory on a per thread basis;
summing the results to form far field results; and
saving the far-field results in a far field results memory.

12. An article comprising:
a machine-readable medium that stores executable instructions to generate radar signatures for multiple objects in real-time based on characteristics, the instructions causing a machine to:
  perform a shooting and bouncing (SBR) technique to determine the characteristics of the multiple objects, the characteristics comprising:
    physical optics of electromagnetic (EM) physics; and
    multi-bounce interaction of EM physics,
  wherein the instructions causing a machine to perform the SBR technique comprises instructions causing a machine to:
    perform dynamic ray tracing using a central processing unit; and
    perform far field calculations using a graphics processing unit (GPU) by using a hit point database to store entries associated with rays that intersect an object.

13. The article of claim 12, further comprising instructions causing a machine to use each thread of the GPU to operate on a single entry in the hit point database.

14. The article of claim 12, further comprising instructions causing a machine to use registers to store a state of each hit point, a hit point entry comprising direction, origin and distance.

15. The article of claim 14, further comprising instructions causing a machine to assign a multiprocessor to process a block of threads.

16. The article of claim 15, further comprising instructions causing a machine to assign a stream processor in the multiprocessor to operate on a single thread in the block.

17. The article of claim 15, further comprising instructions causing a machine to on a per frequency basis:
read entries of the hit point database into registers;
enable the threads to:
  process entries of the registers; and
  save results into a shared memory on a per thread basis;
sum the results to form far field results; and
save the far-field results in a far field results memory.

18. A system to generate radar signatures for multiple objects in real-time comprising:
a first module comprising at least one processor to perform a shooting and bouncing (SBR) technique to solve for physical optics and multi-bounce characteristics of the objects, the at least one processor to perform the SBR technique comprising:
  a central processing unit to perform dynamic ray tracing;
  a graphics processing unit (GPU) to perform far field calculations; the GPU comprising a hit point database to store entries associated with rays that intersect an object; and
a second module comprising at least one processor to perform a physical theory (PTD) technique to solve for material edges of the objects; and
a third module comprising at least one processor to perform an incremental length diffraction coefficient (ILDC) technique to solve for material boss/channel,
wherein results from the first, second and third modules are coherently integrated by frequency to generate RCS values of the objects in real-time.

19. The system of claim 18 wherein the GPU further comprises:
threads and each thread operates on a single entry in the hit point database;
registers to receive hit point entries to store a state of each hit point, a hit point entry comprising direction, origin and distance;
a shared memory;
a far field results memory;
a constant memory; and
a plurality of multiprocessors comprising stream processors,
wherein a multiprocessor is assigned a block of the threads to process and a stream processor operates on a single thread in the block.

20. The system of claim 19 wherein the GPU is configured, on a per frequency basis, to:
read entries of the hit point database into the registers;
enable the threads to:
  process register entries; and
  save results into the shared memory on a per thread basis;
sum the results to form far field results; and
save the far-field results in the far field results memory.

* * * * *